United States Patent
Tabet et al.

(10) Patent No.: US 9,509,392 B2
(45) Date of Patent: Nov. 29, 2016

(54) RANK SIGNALING IN SPATIAL MULTIPLEXING

(75) Inventors: Tarik Tabet, Montreal (CA); Carlo Luschi, Bristol (GB)

(73) Assignee: Nvidia Technology UK Limited, London (GB)

(*) Notice: Subject to any disclaimer, the term of this patent is extended or adjusted under 35 U.S.C. 154(b) by 491 days.

(21) Appl. No.: 13/639,081

(22) PCT Filed: Apr. 12, 2011

(86) PCT No.: PCT/EP2011/055667
§ 371 (c)(1),
(2), (4) Date: May 15, 2013

(87) PCT Pub. No.: WO2011/128314
PCT Pub. Date: Oct. 20, 2011

(65) Prior Publication Data
US 2013/0223502 A1    Aug. 29, 2013

(30) Foreign Application Priority Data

Apr. 13, 2010    (GB) .................................. 1006105.9

(51) Int. Cl.
*H04B 7/06* (2006.01)
*H04L 1/00* (2006.01)

(52) U.S. Cl.
CPC ............ *H04B 7/0697* (2013.01); *H04B 7/063* (2013.01); *H04L 1/0025* (2013.01)

(58) Field of Classification Search
CPC ........ H04B 1/40; H04B 3/23; H04B 7/0697;
H04B 7/063; H04L 27/2647; H04L 27/2332;
H04L 2027/003; H04L 25/067; H04L 1/0045;
H04L 1/06; H04L 1/0025
USPC .......................................................... 375/227
See application file for complete search history.

(56) References Cited

U.S. PATENT DOCUMENTS

| | | |
|---|---|---|
| 2006/0270360 A1 | 11/2006 | Han et al. |
| 2006/0276212 A1* | 12/2006 | Sampath et al. ............... 455/513 |
| 2008/0063115 A1* | 3/2008 | Varadarajan et al. ......... 375/299 |
| 2008/0268785 A1 | 10/2008 | McCoy et al. |
| 2010/0183087 A1* | 7/2010 | Hosokawa et al. ............ 375/262 |

FOREIGN PATENT DOCUMENTS

| | | |
|---|---|---|
| EP | 1865644 A1 | 12/2007 |
| WO | 2006138337 A1 | 12/2006 |
| WO | 2011128314 A1 | 10/2011 |

* cited by examiner

*Primary Examiner* — Ted Wang (57) ABSTRACT

Method, receiver and computer program product for processing a signal transmitted over a wireless network from a plurality of spatially separated transmit antennas of a transmitter using a Multiple-Input Multiple-Output transmission. The signal is received at a plurality of receive antennas, the signal comprising a plurality of data streams. The channel quality for each of the data streams in the received signal is determined and based on the determined channel quality of the data streams, the number of independent data streams that can be supported in the Multiple-Input Multiple-Output transmission of the signal is determined. An indication of the determined number is transmitted to the transmitter.

13 Claims, 6 Drawing Sheets

RANK SIGNALING IN SPATIAL MULTIPLEXING

CROSS-REFERENCE TO RELATED APPLICATION

This application is the National Stage of, and therefore claims the benefit of, International Application No. PCT/EP2011/055667 filed on Apr. 12, 2011, entitled "RANK SIGNALING IN SPATIAL MULTIPLEXING," which was published in English under International Publication Number WO 2011/128314 on Oct. 20, 2011, and has a priority date of Apr. 13, 2010, based on GB application 1006105.9. Both of the above applications are commonly assigned with this National Stage application and are incorporated herein by reference in their entirety.

FIELD OF THE INVENTION

This invention relates to decoding a signal, and in particular to decoding a signal transmitted via a Multiple-Input Multiple-Output (MIMO) transmission over a wireless network.

BACKGROUND

Recent advances of wireless communications have led to the emergence of new multi-user communication techniques, including multi-user diversity and Successive Interference Cancellation (SIC). SIC is the optimal multiple access scheme to achieve the uplink capacity, see, e.g., D. Tse and P. Viswanath, "Fundamentals of Wireless Communication", Cambridge University Press, 2005. In a conventional single-decoder receiver, the interference from data streams associated with other users in the network is treated as noise. Differently, in an uplink receiver employing SIC, a data stream associated to a first user is decoded and the corresponding reconstructed data stream is removed from the aggregate received signal, before the next data stream is decoded. This process is repeated for each data stream until all of the data streams in the signal have been decoded. SIC techniques can also be used on the downlink, where data streams intended for different users are simultaneously transmitted and potentially interfere with each other. Using a SIC receiver at a particular user's device, the data streams with the highest signal quality (corresponding to the lowest probability of decoding error) are decoded first and the corresponding reconstructed signals are then successively removed from the received signal, before the data stream intended for the particular user is decoded. SIC processing is described for example in M. K. Varanasi and T. Guess, "Optimum Decision Feedback Multiuser Equalization with Successive Decoding Achieves the Total Capacity of the Gaussian Multiple-Access Channel", in Proceedings of Thirty-First Asilomar Conference on Signals, Systems, and Computers, vol. 1, pp. 1405-1409, November 1997, and in D. Tse and P. Viswanath, "Fundamentals of Wireless Communication", Cambridge University Press, 2005. The implementation of a SIC receiver requires a significant use of processing resources. In the downlink, the use of SIC techniques at the user equipment (UE) receiver is therefore limited by its complexity, which scales with the number of users.

In a Multiple-Input Multiple-Output (MIMO) system, spatial multiplexing allows the transmission of multiple data streams (or data layers) over different spatial channels. As is known in the art, multiple transmit antennas can send different data streams over separate spatial channels, and the use of multiple receive antennas can allow the recovery of the different data streams, see, e.g., G. J. Foschini and M. J. Gans, "On Limits of Wireless Communications in a Fading Environment when Using Multiple Antennas", Wireless Personal Communications, vol. 6, no. 3, pp. 311-335, March 1998, I. E. Telatar, "Capacity of Multi-Antenna Gaussian Channel", European Transactions of Telecommunications, vol. 10, no. 6, pp. 585-595, November/December 1999, and D. J. Love and R. W. Heath, Jr., "Limited Feedback Unitary Precoding for Spatial Multiplexing Systems", IEEE Transactions on Information Theory, vol. 51, no. 8, August 2005. As shown schematically in FIG. 1, each transmit antenna $14_1$ and $14_2$ transmits to each (both) receive antennas $16_1$ and $16_2$ at the receiver. Any number of transmit antennas and receive antennas may be used, and the maximum number of data streams that can be distinguished due to the spatial multiplexing is equal to the lower of the number of transmit antennas and the number of receive antennas.

Figure 1:
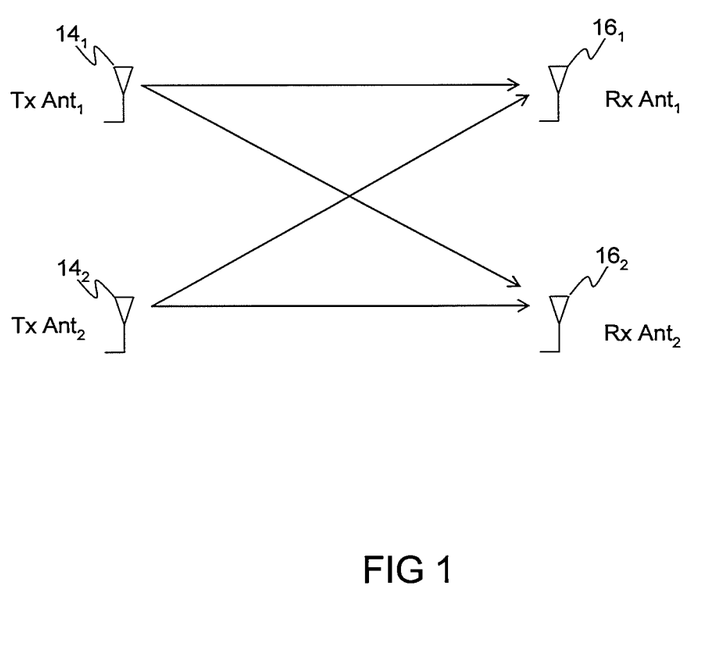
FIG. 1 is a schematic representation of MIMO transmission with $N_T=2$ transmit antennas and $N_n=2$ receive antennas.

The transmission system shown in FIG. 1 can be described by the equation $$r = Hx + n \quad (1)$$

where r denotes the received signal vector, x is the transmitted signal vector, H indicates the MIMO channel matrix, and n is the noise (noise-plus-interference) vector. The channel matrix H models the characteristics of the MIMO propagation channel. In the case of a frequency non-selective channel, Equation (1) can be expanded as $$\begin{bmatrix} r_1 \\ r_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix}, \quad (2)$$

where $r_1$ and $r_2$ are the signals received at the respective receive antennas $16_1$ and $16_2$; $x_1$ and $x_2$ are the signals transmitted from the respective transmit antennas $14_1$ and $14_2$; $h_{11}$, $h_{12}$, $h_{21}$ and $h_{22}$ are the coefficients of the (frequency non-selective) MIMO channel; and $n_1$ and $n_2$ are the noise (noise-plus-interference) at the respective receive antennas $16_1$ and $16_2$. The noise-plus-interference term typically includes noise generated inside the receiver, which is conventionally modelled by an equivalent stochastic process at the antenna connector.

A successive interference cancellation (SIC) technique can be used to improve the decoding process in the MIMO system. Once a data stream is correctly decoded, the corresponding received signal component can be reconstructed and subtracted from the received signal. Assuming that each data stream is decoded perfectly and the corresponding reconstructed signal is subtracted at each stage of the SIC procedure, then decoding the final data stream is performed with no interference caused by the other data streams in the received signal.

The SIC technique is applicable to both cases of Multi-User MIMO (MU-MIMO) transmission, where the multiple spatially separated data streams are simultaneously transmitted to multiple users, and Single-User MIMO (SU-MIMO) transmission, where the multiple parallel data streams are transmitted to a single user.

The SIC technique is particularly sensitive to error propagation. If an error occurs in decoding or subtracting one of the data streams, then the subsequent data streams to be processed are likely to be affected by an increased probability of decoding errors. The ordering of the data streams can affect the error propagation. In a MIMO system where all of the data streams are equally protected by channel coding, the data streams are decoded starting from the strongest data stream (in a Signal to Noise Ratio sense or based on other suitable metrics) and continuing by decoding progressively weaker data streams in sequence.

SUMMARY

The present invention relates to improvements in the decoding of signals transmitted via a MIMO transmission. In particular, we consider the number of independent data streams that can be supported in the MIMO transmission.

According to a first aspect of the invention there is provided a method of processing a signal transmitted over a wireless network from a plurality of spatially separated transmit antennas of a transmitter using a Multiple-Input Multiple-Output transmission, the method comprising: receiving the signal at a plurality of receive antennas, the signal comprising a plurality of data streams; determining the channel quality for each of the data streams in the received signal; based on the determined channel quality of the data streams, determining the number of independent data streams that can be supported in the Multiple-Input Multiple-Output transmission of the signal; and transmitting an indication of the determined number to the transmitter.

According to a second aspect of the invention there is provided a receiver for processing a signal transmitted over a wireless network from a plurality of spatially separated transmit antennas of a transmitter using a Multiple-Input Multiple-Output transmission, the receiver comprising: receiving means comprising a plurality of received antennas for receiving the signal, the signal comprising a plurality of data streams; first determining means for determining the channel quality for each of the data streams; second determining means for determining, based on the determined channel quality of the data streams, the number of independent data streams that can be supported in the Multiple-Input Multiple-Output transmission of the signal; and transmitting means for transmitting an indication of the determined number to the transmitter.

According to an third aspect of the invention there is provided a wireless network comprising: a transmitter comprising a plurality of transmit antennas for transmitting a signal over the wireless network using a Multiple-Input Multiple-Output transmission; and a receiver as described above in the second aspect of the invention for receiving and processing the signal.

According to a fourth aspect of the invention there is provided a computer program product comprising computer readable instructions for execution at a receiver of a wireless network, the receiver being configured to receive a signal transmitted over the wireless network from a plurality of spatially separated transmit antennas of a transmitter using a Multiple-Input Multiple-Output transmission, wherein the instructions comprise instructions for: determining the channel quality for each of the data streams in the received signal; based on the determined channel quality of the data streams, determining the number of independent data streams that can be supported in the Multiple-Input Multiple-Output transmission of the signal; and transmitting an indication of the determined number to the transmitter.

This contrasts with the conventional technique: the number of independent data streams that can be supported is conventionally derived by directly determining the rank of the channel matrix or, e.g., in the presence of a finite set of precoding matrices (transmission codebook), by determining the set of matrices that provide the best performance (for instance, the maximum sum data rate).

According to a fifth aspect of the invention there is provided a method of transmitting a signal over a wireless network from a plurality of spatially separated transmit antennas of a transmitter to a plurality of receive antennas of a receiver using a Multiple-Input Multiple-Output transmission, the signal comprising a plurality of data streams, the method comprising: receiving a channel quality indicator from the receiver for each of the data streams; based on the channel quality indicator of the data streams, determining the number of independent data streams that can be supported in the Multiple-Input Multiple-Output transmission of the signal; and transmitting the signal to the receiver using the determined number of independent data streams.

According to a sixth aspect of the invention there is provided a transmitter for transmitting a signal over a wireless network from a plurality of spatially separated transmit antennas of the transmitter to a plurality of receive antennas of a receiver using a Multiple-Input Multiple-Output transmission, the signal comprising a plurality of data streams, the transmitter comprising: receiving means for receiving a channel quality indicator from the receiver for each of the data streams; determining means for determining, based on the channel quality indicator of the data streams, the number of independent data streams that can be supported in the Multiple-Input Multiple-Output transmission of the signal; and transmitting means for transmitting the signal to the receiver using the determined number of independent data streams.

According to a seventh aspect of the invention there is provided a computer program product comprising computer readable instructions for execution at a transmitter of a wireless network, the transmitter being configured to transmit a signal over the wireless network from a plurality of spatially separated transmit antennas of the transmitter to a plurality of receive antennas of a receiver using a Multiple-Input Multiple-Output transmission, the signal comprising a plurality of data streams, wherein the instructions comprise instructions for: receiving a channel quality indicator from the receiver for each of the data streams; based on the channel quality indicator of the data streams, determining the number of independent data streams that can be supported in the Multiple-Input Multiple-Output transmission of the signal; and transmitting the signal to the receiver using the determined number of independent data streams.

Embodiments of the present invention address the problem of ordering the data streams in a received MIMO signal for use in a SIC decoding technique. Typically, the modulation scheme and coding rate of the different data streams transmitted in the downlink are individually adapted to the channel conditions based on feedback of the current channel quality from the receiver. Error propagation is minimized by sending appropriate information on the quality of the data streams from the receiver to the transmitter. In a Single-User MIMO (SU-MIMO) system, i.e., a MIMO system where all of the parallel data streams are intended for a single receiver, the receiver can preferentially treat one of the data streams such that it is chosen to be decoded first in the SIC decoding. The channel quality of the preferentially treated data stream is underreported to the transmitter (e.g. by reporting an adjusted value of the channel quality). In response the transmitter will follow the reported channel quality for that particular data stream, which will in turn reduce the error-rate of that particular data stream after decoding. Since that data stream is chosen to be the first data stream to be decoded in the SIC decoding, fewer errors propagate through to the decoding of the other data streams. In this way, the performance of the overall SIC decoding will be improved.

Information on the quality/reliability of each data stream (e.g. the coding rate and modulation scheme of each data stream) can also be used to adaptively switch between a non-SIC decoding technique and a SIC decoding technique. When decoding one of the data streams in the received signal, the non-SIC decoding technique treats the other data streams as noise. Differently, as described above, the SIC decoding technique decodes one data stream and then removes the reconstructed signal corresponding to that data stream from the received signal before decoding subsequent data streams. Compared to the non-SIC decoding technique, the SIC decoding technique may result in improved performance (increased supported data rate or reduced error rate), but requires more processing power to implement. Depending on the conditions on the data streams and/or on the capabilities of the receiver, the receiver can dynamically choose between using the SIC decoding technique or the non-SIC decoding technique.

The information on the channel quality for each data stream (e.g., the reported coding rate and modulation scheme of each data stream) can also be used to decide the number of data streams that can be supported in the MIMO transmission, as in the aspects of the invention described above. This can be reported from the receiver to the transmitter using a rank indicator (RI), which indicates the rank of the channel matrix. The rank of the channel matrix is defined as the number of linearly independent columns of the channel matrix and can be used to indicate the number of spatial dimensions of the MIMO channel. For example, for a MIMO transmission with four transmit antennas ($N_T=4$) and four receive antennas ($N_R=4$), the 4×4 channel matrix can have rank equal to 4, 3, 2 or 1 (rank≤min ($N_T$, $N_R$)). The rank of the channel matrix also determines the size of a precoding matrix which is used by the transmitter, i.e., the number of columns of the precoding matrix.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 2:
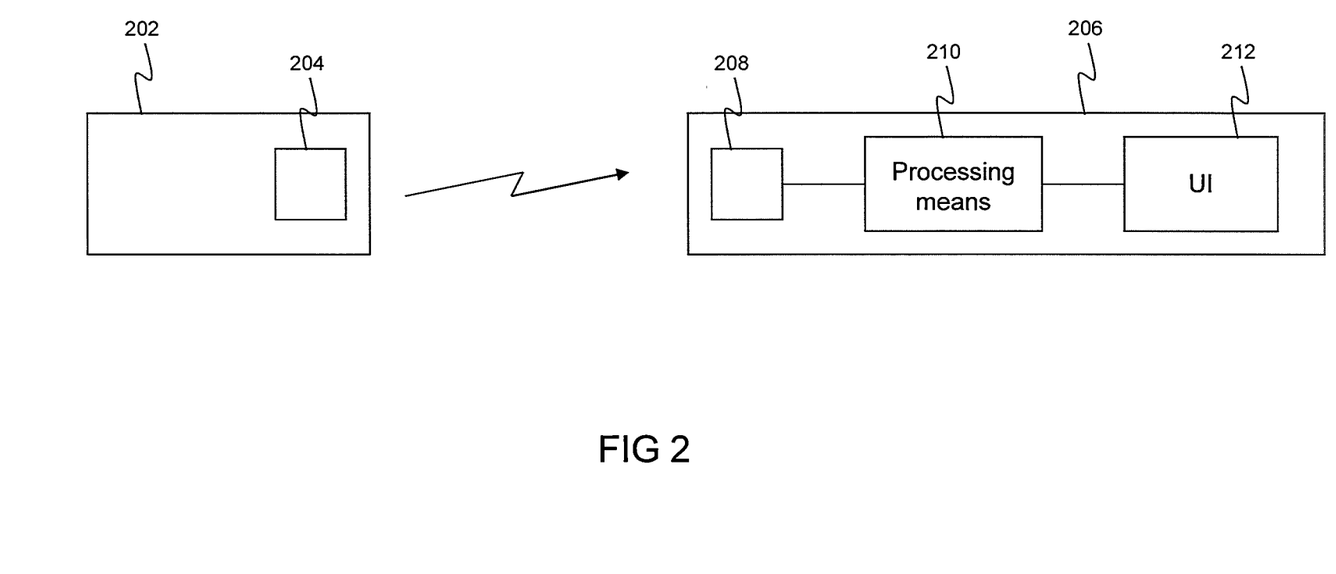
FIG. 2 is a schematic representation of a transmitter and a receiver according to a preferred embodiment.

With reference to FIG. 2 there is now described a preferred embodiment of the present invention. A transmitter 202 comprises a transmit antenna block 204 having multiple antennas, such as antennas $14_1$ and $14_2$ shown in FIG. 1, for use in MIMO transmission. A receiver 206 comprises a receive antenna block 208 having multiple antennas, such as antennas $16_1$ and $16_2$ shown in FIG. 1, for use in MIMO transmission. The schematic representation of FIG. 1 refers to the case of $N_T=2$ transmit antennas and $N_R=2$ receive antennas only for simplicity of illustration, while the validity of the present invention is maintained for a different number of transmit and receive antennas. The receiver 206 also comprises processing means 210 and a user interface 212. The processing means 210 is connected to the receive antenna block 208 and to the user interface 212. The user interface 212 is used to communicate data to and from a user of the receiver 206. For example, the user interface may comprise a speaker and a visual display for outputting data to the user and a microphone, a camera and a keypad allowing the user to input data to the receiver 206.

In operation, data is transmitted wirelessly from the transmitter 202 to the receiver 206 with a MIMO transmission using the transmit antenna block 204 and the receive antenna block 208. In this way multiple data streams are transmitted between the transmitter 202 and the receiver 206. A Successive Interference Cancellation (SIC) technique is used to decode the data streams at the receiver 206. In order to minimize error propagation in the SIC technique, it is advantageous to decode a full data stream before cancellation of the reconstructed signal corresponding to the considered data stream from the received signal. It is preferable to decode the different data streams in an order that matches their quality/reliability in the received signal. More specifically, the receiver 206 is adapted to first decode the most reliable data stream, where the most reliable data stream is the one producing the lowest number of errors at the decoder output. In this way, the error propagation is minimized in the SIC technique.

Figure 3A:
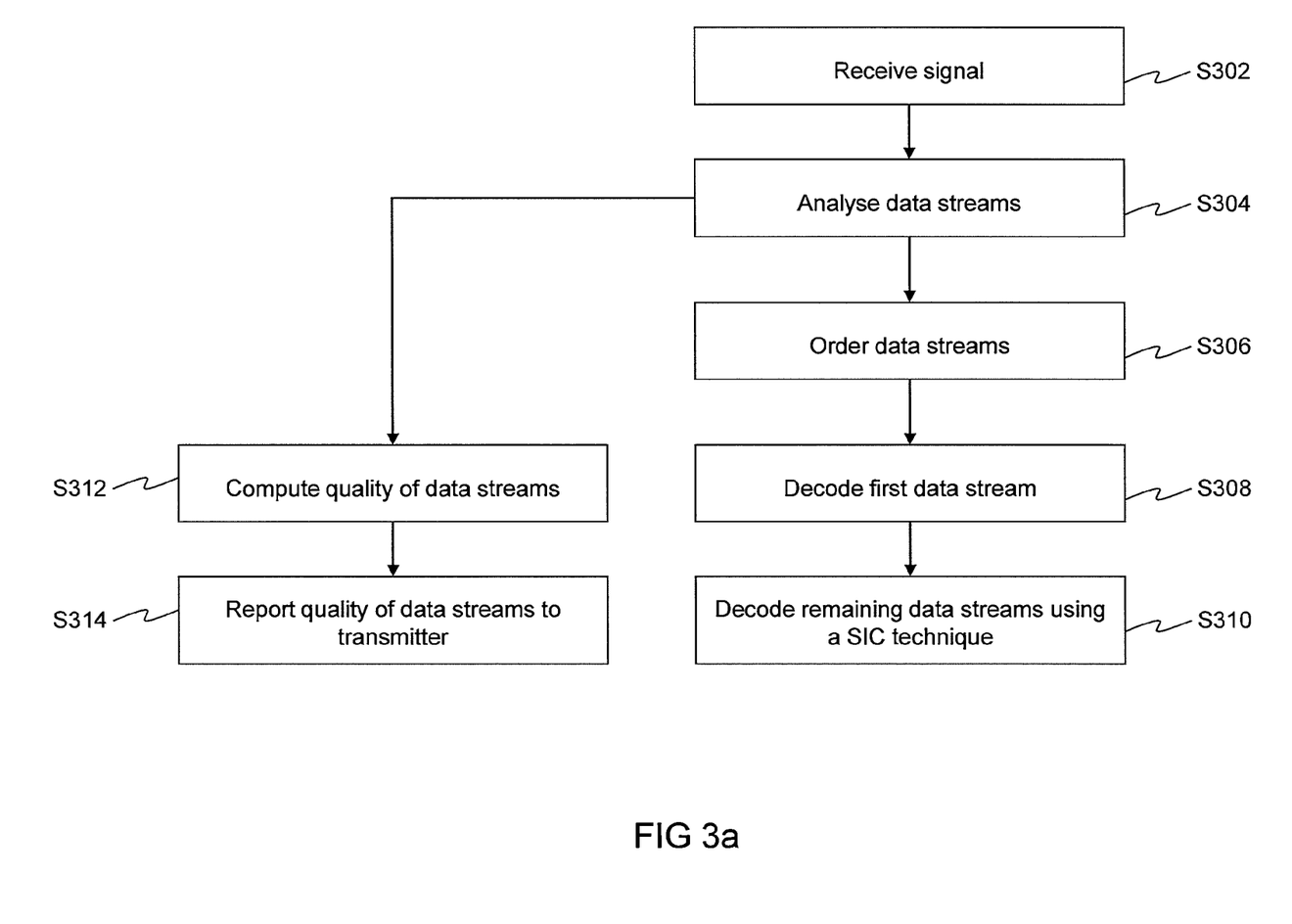
FIG. 3a is a flow chart for a process of decoding a signal according to a SIC technique.

With reference to FIG. 3a, there is now described a method of decoding a signal according to a SIC technique. In step S302 the signal is received at the receive antenna block 208. The signal comprises multiple data streams transmitted as described above from the transmit antenna block 204.

In step S304 the data streams are analysed to determine an ordering for decoding the data streams and then in step S306 the data streams are ordered in accordance with the analysis performed in step S304. In step S308 the first data stream of the ordered data streams is selected and decoded.

In step S310 the remaining data streams in the signal are decoded using a SIC technique. In this way, the ordering performed in steps S304 and S306 determines which data stream is decoded first. Once the first data stream has been decoded, the reconstructed signal corresponding to the first data stream is removed from the received signal. The SIC technique continues by successively decoding the remaining data streams in accordance with the ordering established in step S306.

Following the analysis of the data streams in step S304 the method also passes to step S312 in which the quality of the data streams is computed. The quality of the data streams is reported to the transmitter in step S314.

Figure 3B:
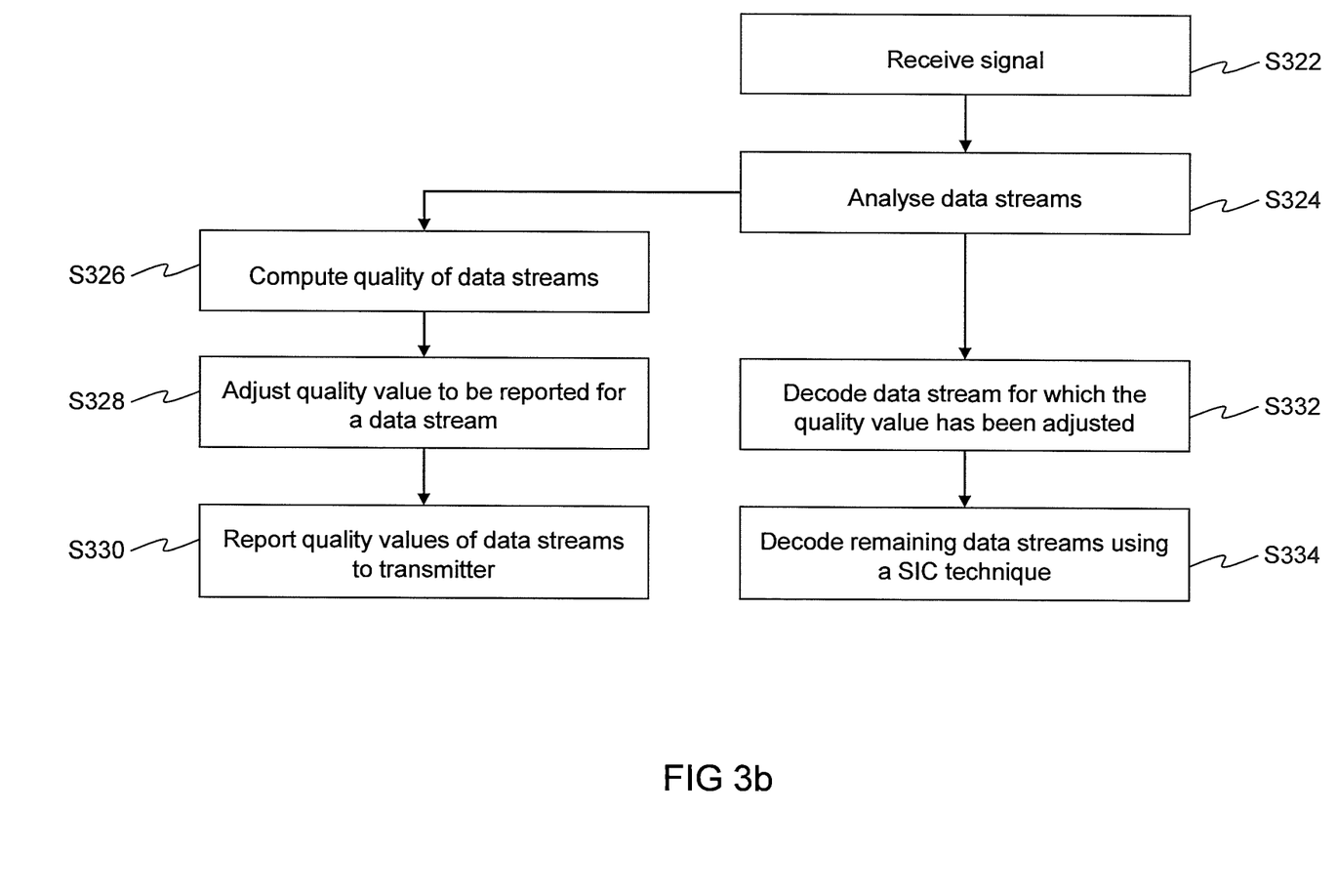
FIG. 3b is a flow chart for a process of decoding a signal according to a first method.

With reference to FIG. 3b, there is now described a method of decoding a signal according to a first method. In step S322 the signal is received at the receive antenna block 208. The signal comprises multiple data streams transmitted as described above from the transmit antenna block 204.

In step S324 the data streams are analysed. However, in contrast to the analysis performed in step S304 of FIG. 3a, an ordering for decoding the data streams is not determined.

Following step S324 the method passes to step S326 in which the quality of the data streams is computed. In step S328 a data stream is selected and the value of the quality of the selected data stream to be reported to the transmitter is adjusted. In step S328 more than one data stream may be selected and the values of the quality of the selected data streams to be reported to the transmitter may be adjusted. It can be particularly useful to select more than one data stream in step S328 when there are more than two data streams in total. In step S330 the receiver 206 then sends a report of the quality of the data streams to the transmitter 202, which includes the adjusted quality value for the selected data stream(s). Each data stream is encoded separately at the transmitter 202 such that each data stream is coded and mapped to a number of modulation symbols by the transmitter 202 depending on the information on the reception quality fed back by the receiver 206 on each data stream. The information describes the channel quality and it is often reported in terms of a corresponding Modulation and Coding Scheme (MCS).

The analysis of the data streams performed in step S324 and S326 is implemented in software in the preferred embodiment in the processing means 210. In alternative embodiments the analysis is carried out in hardware rather than in software.

In steps S332 and S334 the signal is decoded using a SIC technique. In this way, the data stream selected in step S328 is decoded first in step S332. Once the selected data stream has been decoded, the reconstructed signal corresponding to the selected data stream is removed from the received signal. The SIC technique continues by decoding the remaining data streams. In this way, the number of errors in the decoded signal, across all the data streams, is reduced. Where more than one data stream is selected in step S328 those selected data streams are decoded before the remaining data streams are decoded.

Step S332 uses the information on which data stream has had an adjusted quality value reported to the transmitter 202 in previous Transmission Time Interval(s) (TTI). This means that if in step S328 in a particular TTI a new data stream is selected for reporting an adjusted value of the quality to the transmitter, then step S332 will not switch to decoding that new data stream first in that particular TTI. Only in subsequent TTIs will step S332 switch to decoding the new data stream first.

In the first method, in the case of Single-User MIMO (SU-MIMO) transmission, the receiver 206 determines that a particular data stream will be decoded first in the SIC decoding. Furthermore, the receiver 206 reports a lower MCS to the transmitter 202 in step S330 for the particular data stream. In other words, the receiver 206 reports to the transmitter 202 that one of the data streams is received with a lower quality than it actually is. This is referred to as 'underreporting' the quality of the data stream. In this way, the receiver reports an adjusted value of a characteristic (in this case the quality) of a particular data stream to the transmitter. In response to receiving this report, the transmitter 202 will transmit a more robust MCS (requiring a lower Signal-to-Noise Ratio for a given error probability), which in turn will decrease the probability of error for the considered data stream, when decoded by the receiver 206. The information of the bias in the reported channel quality of the particular data stream will be taken into account in the ordering and selection of the data streams in step S332. In this way the receiver 206 will in practice determine the ordering of the data streams in the SIC decoding. Furthermore, by underreporting the quality of the first data stream to be decoded, the block error rate of that particular data stream is reduced, such that the effect of error propagation in the SIC decoding is reduced. In this way the overall performance of the receiver 206 is improved. In fact, any errors in decoding the data stream which is selected to be decoded first in the SIC decoding technique would propagate through to the decoding of all of the other data streams, and it is therefore particularly important to reduce the decoding errors on the first data stream to be decoded. The approach can be extended to the reporting and ordering of the remaining data streams.

This scheme is particularly useful in the case where the data streams experience similar propagation conditions. In this case, all the data streams will have a similar probability of error, which in turn results in a lack of ordering of the reception quality of the data streams at the receiver 206. This lack of ordering will cause a degradation of the performance of a conventional SIC decoding technique. In the preferred embodiment described above, an adjusted value of the channel quality of a particular data stream is reported to the transmitter 202, and the receiver chooses the particular data stream to be the first to be decoded and subtracted from the received signal. In this way, the overall performance of the receiver is improved by increasing the reliability of SIC processing.

In conventional SIC decoding techniques the first step is often to analyse the data streams to thereby select the data stream which has the highest quality to be the first data stream to be decoded. However, in preferred embodiments of the present invention the SIC decoding does not require a step of analysing the data streams to thereby order the data streams (i.e. a step similar to step S306 of FIG. 3a is not required in the method described above in relation to FIG. 3b). Instead a particular data stream is chosen by the receiver to be the first data stream to be decoded, and the quality (or some other characteristic, e.g. the reliability) of the chosen data stream is underreported to the transmitter, such that the chosen data stream is preferentially treated to have an improved quality (or an improved characteristic, e.g. reliability). This removes the need for the analysing and selecting steps in the SIC decoding which can reduce the processing required to perform the SIC decoding.

The data stream chosen to be decoded first in the SIC decoding and to be underreported to the transmitter can be chosen based on the quality of the received data stream. For example, the data stream may be chosen because it has the highest quality of the received data streams. The data stream may be chosen because it has the lowest quality of the data streams, hence reducing the complexity of encoding and subtracting that particular stream. Alternatively, the data stream can be chosen independently of the quality of the data streams, e.g. the data stream can be chosen randomly. It will be apparent to the skilled person that different methods for choosing a data stream may be employed in different embodiments of the invention.

The receiver could additionally use the information provided by the cyclic redundancy check (CRC) of each decoded block of the first data stream, and decide depending on the CRC which block is to be regenerated and subtracted from the received signal. That is, the technique works at the block level but also at the codeword level. One transport block of one stream may contain multiple coded blocks each with its own CRC.

In the preferred embodiment described above the ordering of the data streams depends on the reports generated at the receiver 206 and on the channel quality. This is advantageous in that the receiver 206 has control over the ordering of the data streams.

Figure 4:
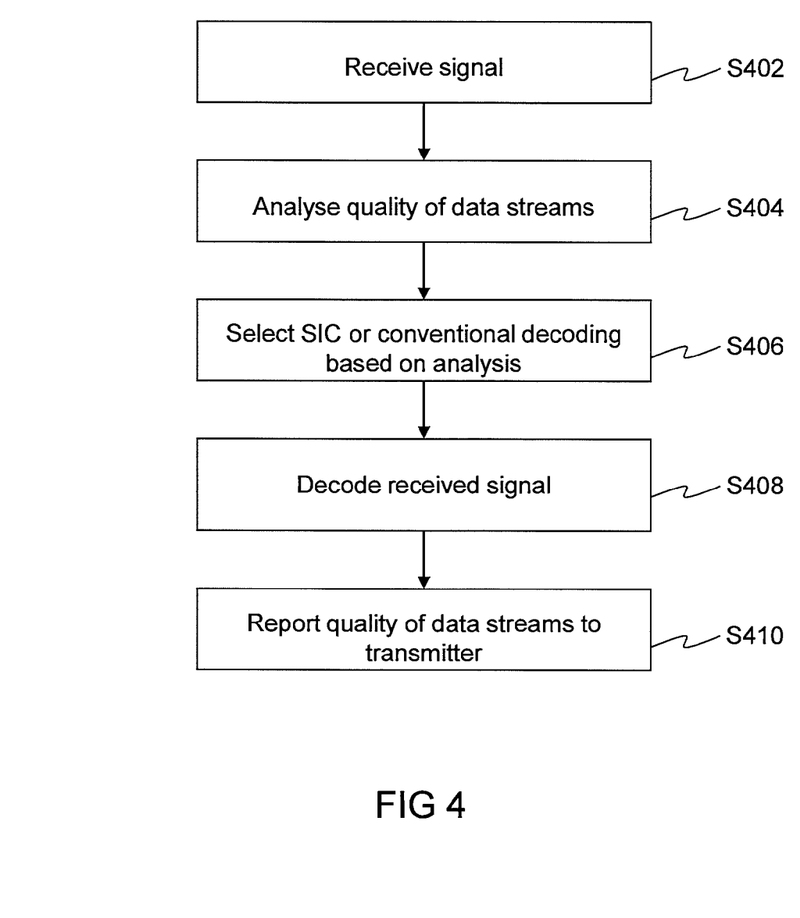
FIG. 4 is a flow chart for a process of decoding a signal according to a second method.

With reference to FIG. 4 there is now described a second method of decoding a signal. Steps S402 and S404 correspond to steps S312 and S314 described above. Therefore in step S402 a signal comprising multiple data streams is received at the receive antenna block 208 and in step S404 the data streams are analysed to determine information on the received quality (supported MCS) of each data stream. The information on supported channel quality/reliability and the MCS for each data stream is used to adaptively switch between a conventional decoding technique and a SIC decoding technique. In step S406 a SIC decoding technique or a conventional decoding technique is selected. As described above, the SIC technique involves successively decoding one of the data streams and then removing the data stream from the received signal before decoding subsequent data streams. In this way the data streams are decoded in order and the interference caused by a data stream is reduced when decoding a subsequent data stream. However, in a conventional decoding technique (i.e. a non-SIC decoding technique) each data stream is decoded from the received signal separately and the other data streams are treated as noise in the received signal. If the analysis of step S404 suggests that all the data streams experience communication channels with similar quality/reliability, and specifically with similar probability of error, then the ordering of the data streams is difficult, and the improvement in using a SIC technique as compared to using a conventional decoding technique would be limited. In that case, in order to save in complexity, in step S406 a conventional decoding technique would be selected because a conventional decoding technique uses less of the processing resources of the receiver 206 than would be used by a SIC decoding technique. The selection in step S406 may be based, at least in part, on the processing resources available at the receiver 206.

In step S408 the decoding technique selected in step S406 is used to decode the received signal, and the final step is to report the quality of the data streams to the transmitter in step S410.

In this way, where the use of a SIC decoding technique is advantageous, the SIC decoding technique is selected in step S406. However, where the detriment of the extra processing resources required to perform the SIC decoding technique outweighs the advantages of the improved quality of decoded data streams produced by using the SIC decoding technique, then a conventional decoding technique is used instead of the SIC decoding technique. This provides the receiver 206 with added flexibility for adapting the decoding technique to the specific conditions on the communication channel. The decision between a SIC decoding technique and a conventional decoding technique can be made dynamically in response to changing channel conditions.

By way of example, the case of two data streams is now considered. The reception quality of the data streams in the received signal is determined, and the difference in the probability of error in decoding the two data streams is estimated. If the difference in the estimated error probability of the two data streams is greater than a threshold value, then the SIC decoding technique is used, because it is advantageous to remove the more reliable data stream before decoding the less reliable data stream. However, if the difference in the estimated error probability of the two data streams is less than the threshold value, then the conventional decoding technique is used, because it is advantageous to avoid the extra processing required by a SIC decoding technique.

In pseudo-code this example can be described as follows:

```
if (Delta_P_e > θ)
    use MMSE-SIC
else
    use MMSE
end
``` where $\text{Delta\_P}_e$ denotes the difference between the estimated error probability of the second data stream and the estimated error probability of the first data stream, $\theta$ is a design parameter indicating a threshold value, MMSE-SIC is a minimum mean square error SIC decoding technique and MMSE is a conventional minimum mean square error decoding technique.

In the preferred embodiment of the invention the CQI information is used to indicate the rank of the MIMO communication channel, i.e. the number of data streams that can be supported on the communication channel. The actual value of the CQI of the first data stream and the difference Delta_CQI between the reported Channel Quality Indicator (CQI) of the two data streams, are used by the receiver 206 to form an indication of the condition of the communication channel. This indication can be used to determine the number of independent data streams, i.e., the rank of the communication channel. The Delta_CQI gives a relative measure of the quality of the two data streams in contrast to the actual value of the CQI which gives an independent measure of the quality of a data stream. It is also possible to use the actual value of the CQI for the first and second data streams rather than using the actual value of the CQI of the first data stream and the difference Delta_CQI between the reported Channel Quality Indicator (CQI) of the two data streams. The receiver and the transmitter use the same scheme for defining the CQIs of the data streams.

Figure 5:
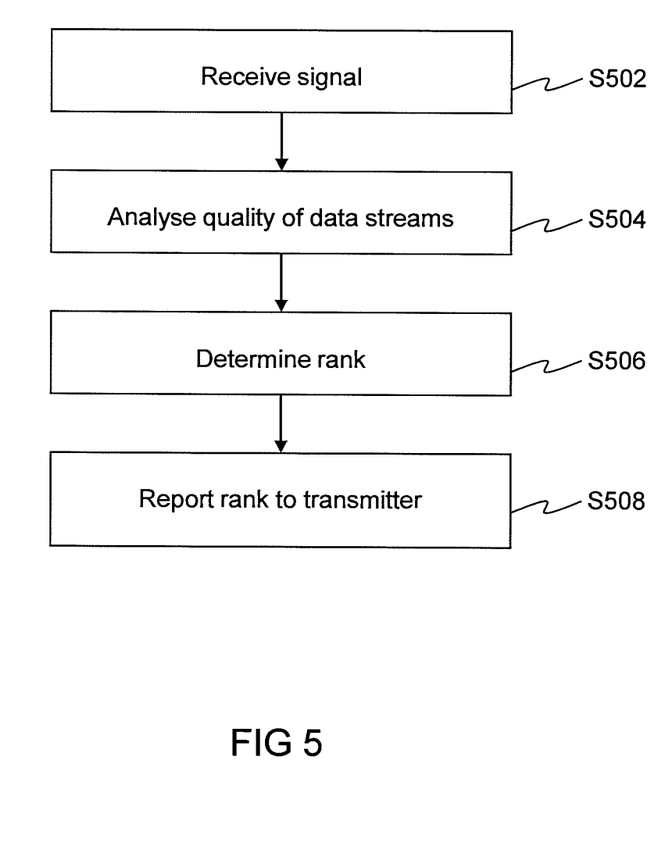
FIG. 5 is a flow chart for a process of decoding a signal according to a third method.

The method of the preferred embodiment is described with reference to FIG. 5. Similarly, to steps S302 and S304, in step S502 the signal is received at the receiver 206 from the transmitter 202 via a MIMO transmission. In step S504 the received signal is analysed to determine the quality of the data streams. In this way a Channel Quality Indicator (CQI) is produced for each of the data streams.

In step S506 the rank of the channel is determined at the receiver 206. The number of data streams that can be supported in a MIMO transmission is linked to the condition number of the channel matrix H (i.e. the rank of the channel matrix H). The rank of the channel matrix provides the number of independent data streams that can be supported in the MIMO transmission. A channel matrix of full rank will provide the maximum number of independent data streams, whereas an ill-conditioned channel matrix will give a lower number of independent data streams.

As an example, for two transmit antennas and two receive antennas (as shown in FIG. 1) a channel matrix of $$H = \begin{bmatrix} 1 & 0 \\ 0 & 1 \end{bmatrix}$$

has a rank of two because there are two independent columns. This means that two independent data streams can be used in the MIMO transmission. In fact, with this channel matrix, the data stream transmitted from each transmit antenna can be recovered independently.

However, a channel matrix of $$H = \begin{bmatrix} 1 & 1 \\ 1 & 1 \end{bmatrix}$$

has a rank of one because the columns are not independent. This means that only one independent data stream can be used in the MIMO transmission.

The channel matrix varies dynamically as the conditions of the channel vary. Therefore the rank of the channel matrix is determined dynamically in order to optimize the number of independent data streams in accordance with the current conditions for the MIMO transmission.

When the rank of the channel matrix has been determined, in step S508 a Rank Indicator (RI) message is reported from the receiver 206 to the transmitter 202 to inform the transmitter 202 of the determined channel rank to be used on the communication channel.

As another example, in the case of two transmit antennas and two receive antennas (as shown in FIG. 1), a situation where the Signal-to-Noise Ratio (SNR) is relatively low and the CQI difference Delta_CQI is relatively high, would indicate that there is one strong data stream and one weak data stream. In these conditions, the communication channel cannot realistically support spatial multiplexing of two streams, and so the message sent to the transmitter 202 instructs the transmitter 202 to use a channel with a rank of one.

Alternatively, the preferred embodiment may be implemented at the transmitter after having received a channel quality indicator for each of the data streams from the receiver. In this case, the transmitter determines the number of independent data streams that can be supported in the MIMO transmission of the signal based on the channel quality indicator received from the receiver. The transmitter can then transmit the signal to the receiver using the determined number of independent data streams.

There are described above new methods of decoding a received signal in a MIMO system. The methods described above introduce an adaptation criterion for SIC processing; simplify the data stream ordering operation; improve the system performance; provide a solution for the case where all the data streams are experiencing similar quality/reliability; do not require any further processing with respect to the implementation of the SIC receiver; and do not impact other end-users, in contrast to power-controlled systems, where by changing the power level one may modify the interference level or decrease the reliability.

In the methods described above, the functional steps shown in FIGS. 3 to 5 are performed in software by the processing means 210. In alternative embodiments, these steps are performed by hardware in the receiver 206.

While this invention has been particularly shown and described with reference to preferred embodiments, it will be understood to those skilled in the art that various changes in form and detail may be made without departing from the scope of the invention as defined by the appendant claims.

The invention claimed is:

1. A method of processing a signal at a receiver that receives the signal transmitted over a wireless network from a plurality of spatially separated transmit antennas of a transmitter using a Multiple-Input Multiple-Output transmission, the method comprising:
receiving the signal at a plurality of receive antennas of the receiver, the signal comprising a plurality of data streams;
determining the channel quality for each of the data streams in the received signal;
based on the determined channel quality of the data streams, determining the number of independent data streams that can be supported in the Multiple-Input Multiple-Output transmission of the signal; and
transmitting an indication of the determined number to the transmitter.

2. The method of claim 1 wherein the step of determining the number of independent data streams is based on the actual values of the determined channel quality for at least one of the data streams in the received signal.

3. The method of claim 1 wherein the quality of the each of the data streams is determined dynamically.

4. The method of claim 1 wherein the step of determining the number of independent data streams is based on the difference between the determined channel quality for two of the data streams in the received signal.

5. The method of claim 4 wherein the signal comprises only the two data streams.

6. The method of claim 1 wherein the step of determining the number of independent data streams is based on the Signal to Noise Ratio of at least one of the data streams in the received signal.

7. A receiver for processing a signal transmitted over a wireless network from a plurality of spatially separated transmit antennas of a transmitter using a Multiple-Input Multiple-Output transmission, the receiver comprising:
receiving means comprising a plurality of received antennas for receiving the signal, the signal comprising a plurality of data streams;
first determining means for determining the channel quality for each of the data streams;
second determining means for determining, based on the determined channel quality of the data streams, the number of independent data streams that can be supported in the Multiple-Input Multiple-Output transmission of the signal; and
transmitting means for transmitting an indication of the determined number to the transmitter.

8. A wireless network comprising:
a transmitter comprising a plurality of transmit antennas for transmitting a signal over the wireless network using a Multiple-Input Multiple-Output transmission; and
a receiver according to claim 7 for receiving and processing the signal.

9. The network of claim 8 wherein the transmitter comprises:
receiving means for receiving the indication; and
altering means for altering the number of independent data streams in the signal transmitted from the transmitter in accordance with the indication.

10. A computer program product comprising computer readable instructions stored on a non-transitory computer readable medium for execution at a receiver of a wireless network, the receiver being configured to receive a signal transmitted over the wireless network from a plurality of spatially separated transmit antennas of a transmitter using a Multiple-Input Multiple-Output transmission, wherein the instructions direct the operation of a processor when executed and comprise instructions for:
determining the channel quality for each of the data streams in the received signal;

based on the determined channel quality of the data streams, determining the number of independent data streams that can be supported in the Multiple-Input Multiple-Output transmission of the signal; and transmitting an indication of the determined number to the transmitter.

11. A method of transmitting a signal over a wireless network from a plurality of spatially separated transmit antennas of a transmitter to a plurality of receive antennas of a receiver using a Multiple-Input Multiple-Output transmission, the signal comprising a plurality of data streams, the method comprising:

receiving a channel quality indicator from the receiver for each of the data streams, wherein one channel quality indicator for one of the data streams is underreported;

employing a modulation and coding scheme for the one of the data streams based on the underreported channel quality indicator; and transmitting the signal, including the one of the data streams, to the receiver.

12. A transmitter for transmitting a signal over a wireless network from a plurality of spatially separated transmit antennas of the transmitter to a plurality of receive antennas of a receiver using a Multiple-Input Multiple-Output transmission, the signal comprising a plurality of data streams, the transmitter comprising:

receiving means for receiving a channel quality indicator from the receiver for each of the data streams, wherein one channel quality indicator for one of the data streams is underreported;

coding means for employing a modulation and coding scheme for the one of the data streams based on the underreported channel quality indicator; and transmitting means for transmitting the signal, including the one of the data streams, to the receiver using the determined number of independent data streams.

13. A computer program product comprising computer readable instructions stored on a non-transitory computer readable medium for execution at a transmitter of a wireless network, the transmitter being configured to transmit a signal over the wireless network from a plurality of spatially separated transmit antennas of the transmitter to a plurality of receive antennas of a receiver using a Multiple-Input Multiple-Output transmission, the signal comprising a plurality of data streams, wherein the instructions direct the operation of a processor when executed and comprise instructions for:

receiving a channel quality indicator from the receiver for each of the data streams, wherein one channel quality indicator for one of the data streams is underreported;

employing a modulation and coding scheme for the one of the data streams based on the channel quality indicator; and transmitting the signal, including the one of the data streams, to the receiver using the determined number of independent data streams.

* * * * *